(12) United States Patent
Haas et al.

(10) Patent No.: US 9,874,248 B2
(45) Date of Patent: Jan. 23, 2018

(54) SHAFT COUPLING FOR A ROLLER ARRANGEMENT

(71) Applicant: HAAS FOOD EQUIPMENT GMBH, Vienna (AT)

(72) Inventors: Johannes Haas, Vienna (AT); Josef Haas, Leobendorf (AT); Christoph Jiraschek, Frederiksberg (DK); Stefan Jiraschek, Koenigsbrunn (AT)

(73) Assignee: Haas Food Equipment GmbH, Vienna (AT)

( * ) Notice: Subject to any disclaimer, the term of this patent is extended or adjusted under 35 U.S.C. 154(b) by 127 days.

(21) Appl. No.: 14/782,954

(22) PCT Filed: May 13, 2014

(86) PCT No.: PCT/EP2014/059707
§ 371 (c)(1),
(2) Date: Oct. 7, 2015

(87) PCT Pub. No.: WO2014/184168
PCT Pub. Date: Nov. 20, 2014

(65) Prior Publication Data
US 2016/0040722 A1    Feb. 11, 2016

(30) Foreign Application Priority Data
May 17, 2013  (AT) .................................. A 415/2013

(51) Int. Cl.
*B29C 33/30*    (2006.01)
*F16D 1/08*    (2006.01)
(Continued)

(52) U.S. Cl.
CPC ............ *F16D 1/0864* (2013.01); *A23P 30/10* (2016.08); *F16D 2001/102* (2013.01)

(58) Field of Classification Search
CPC ...... F16D 1/08; F16D 1/0864; F16D 2001/10; A23P 1/102; A23P 30/10
(Continued)

(56) References Cited

U.S. PATENT DOCUMENTS 1,947,959 A    2/1934  Williston
3,147,985 A    9/1964  Hornberger et al.
(Continued)

FOREIGN PATENT DOCUMENTS

GB            222662 A    10/1924

*Primary Examiner* — Joseph S Del Sole
*Assistant Examiner* — Thukhanh T Nguyen
(74) *Attorney, Agent, or Firm* — Laurence A. Greenberg; Werner H. Stemer; Ralph E. Locher (57) ABSTRACT

A shaft coupling and roller arrangements with a shaft coupling for the coupling a shaft journal having a polygonal cross-section to a drive or a bearing axle. The shaft coupling has a rotatably drivable coupling body, which has a coupling opening for receiving the shaft journal. The coupling body has a as multipart configuration and is openable along a dividing line, which intersects the coupling opening. A clamping apparatus is provided for non-positive holding of the shaft journal in the coupling opening. The coupling opening is formed at least in part by clamping jaws, which in the closed position are pressed onto the shaft journal, preferably areally flush against the shaft journal, via the clamping apparatus.

16 Claims, 5 Drawing Sheets

(51) Int. Cl.
*A23P 30/10* (2016.01)
*F16D 1/10* (2006.01)
(58) Field of Classification Search
USPC .................. 425/336, 363; 403/325, 373, 383
See application file for complete search history.

(56) References Cited

U.S. PATENT DOCUMENTS 5,064,584 A * 11/1991 Jefferies .................. B29C 43/08
                                                      264/219
5,162,119 A     11/1992 Pappas et al.
5,769,355 A *  6/1998 Guttin .................... B65H 18/02
                                                      242/129.6

* cited by examiner

SHAFT COUPLING FOR A ROLLER ARRANGEMENT

BACKGROUND OF THE INVENTION

Field of the Invention

The invention relates to a roller arrangement for the processing of shaped bodies or dough strips to produce baked products such as, for example biscuits and the like, comprising a roller, a machine frame and a shaft coupling for coupling a shaft journal having a polygonal cross-section to a drive or a bearing axle, comprising a rotatably drivable or driven coupling body, which has a coupling opening for receiving the shaft journal.

Roller arrangements for the processing of dough strips are generally known. In conventional apparatuses, a dough strip is guided via a conveyor belt into the area of a roller. Between the roller and the conveyor belt, a roller gap is provided at least in part, which is adapted to thin, roll out, cut out or shape the dough. The roller is rotationally driven by means of a drive. At regular intervals, in particular for maintenance or cleaning of the rollers and when changing products with cutting rollers, the rollers must be removed from the roller arrangement.

In conventional roller arrangements, the shaft journals of the rollers are clamped in usual mountings. This means that a floating/solid bearing arrangement is provided in which the bearings are screwed tightly by means of a bearing block. Furthermore, in conventional constructions the drive is connected to the roller by means of a screwed flange. In order to remove the rollers, on the one hand the entire mounting, i.e. the bearing block of each individual bearing and the connection to the drive must be separated. This is associated with high expenditure and with long undesired down times of the apparatus.

In the case of guide rollers from the paper industry, quick release fasteners are known for guide rollers. In these the roller has shaft journals protruding on both sides, having polygonal cross-sections. These polygonal shaft journals are inserted in complementary recesses of the shaft mountings similar to a spanner. A rotary connection to the drive is given as a result of the polygonal connection. However, in order to enable the shaft journal to be inserted in the polygonal recess, a certain oversize or play must be provided.

However this mounting with play cannot be used for the processing of dough strips or shaped bodies since, for example, as a result of variations in density, variations in thickness or variation in the viscosity of the dough and also due to the processing per se, irregular loads and impacts are produced. In the case of longer operating time, this subsequently results in severe wear in the area of the polygonal connection.

BRIEF SUMMARY OF THE INVENTION

It is now the object of the invention to provide an apparatus in which on the one hand the maintenance and exchangeability of the rollers is simplified and on the other hand, the lifetime is increased due to a low-wear coupling.

The object is solved in particular by the features of the independent claims.

In particular, whereby the coupling body is designed as multipart and openable along a dividing line, that the dividing line intersects the coupling opening, that a clamping apparatus is provided for non-positive holding of the shaft journal in the coupling opening, that the coupling opening is formed at least in part by clamping jaws, which in the closed position are pressed onto the shaft journal via the clamping apparatus, preferably flat.

Further advantageous features are that the coupling body comprises a first coupling part and a second coupling part, and that the first coupling part is movable with respect to the second coupling part for non-positive connection of the shaft journal to the coupling body and for release of the connection via the clamping apparatus, that in the closed position and with the shaft journal clamping between the first coupling part and the second coupling part, a gap is kept free, that the first coupling part is connected to the second coupling part on one side in a hinge-like manner and that the clamping apparatus is provided on the other side and/or that the clamping apparatus comprises a screw connection for connecting the first coupling part to the second coupling part.

Advantageously, the invention can be configured in such a manner that the clamping apparatus comprises a clamping clip which is connected and/or can be connected to one coupling part on one side in a hinge-like manner and to the other coupling part on the other side, that the clamping clip comprises a first centring flank and a second centring flank, wherein the first centring flank is in operative contact with a centring flank of the first coupling part and the second centring flank is in operative contact with a centring flank of the second coupling part in the closed position, that for centring the shaft journal the clamping jaws are designed to be movable with respect to the coupling body by means of an adjusting thread, that the clamping jaws have contact surfaces for contact against the shaft journal and that the contact surfaces in the closed position are distributed substantially radially symmetrically or rotationally symmetrically about the axis of rotation of the coupling body, and/or that the shaft journal is clamped between the clamping jaws by clamping the clamping apparatus.

The roller arrangement according to the invention preferably has the features that the roller is coupled to the machine frame via a shaft coupling according to any one of the preceding claims, that a driven conveyor belt is provided for conveying the dough strip, wherein the speed of the conveyor belt in the conveying direction substantially corresponds to the circumferential speed of the roller and wherein between the conveyor belt and the roller, a roller gap is provided for passage of the dough strip, that the roller can be removed by opening the coupling body and that the drive, the radial bearing for mounting the drive shaft and the drive shaft is connected to the machine frame, that the roller can be removed by opening the coupling body and that the drive, the radial bearing for mounting the bearing axle and the bearing axle is connected to the machine frame and/or that the first coupling part and the bearing axle are connected in one piece to one another and/or that the first coupling part and the drive shaft are connected in one piece to one another.

The roller arrangement according to the invention comprises a shaft coupling which enables the rollers to be easily exchanged and furthermore optimizes the lifetimes and therefore the maintenance interval and the maintenance time.

For this purpose the shaft coupling comprises a dividable coupling body which is adapted for positive and non-positive mounting of the shaft journal. The coupling body comprises, for example, a first coupling part and a second coupling part, wherein the two coupling parts are separated from one another along a dividing line. A coupling opening for inserting the shaft journal is provided in the coupling body. This coupling opening has an inner contour which substantially corresponds to the outer contour of the shaft journal. However, the contour of the opening is smaller than the outer contour of the shaft journal at least in sections. The parts of the coupling body can be clamped to one another via the clamping apparatus. As a result, the shaft journal is clamped in the coupling opening and connected non-positively. The lifetime is increased by this non-positive play-free coupling. The clamping apparatus according to the invention further enables in a particularly advantageous manner a rapid openability and a rapid exchangeability of the rollers.

Clamping jaws are provided along the contour of the coupling opening. These clamping jaws have contact surfaces with which they can be brought into operative contact with the shaft journal. The clamping jaws can be formed in one piece from the coupling body. According to a further embodiment, the clamping jaws can be implemented by separate individual elements connected to the coupling body.

Furthermore, the clamping jaws can be provided adjustably or movably in the coupling body for example for centring the shaft journal. This means that by a displacement of the clamping jaws to a small extent, the axis of rotation of the roller can be brought into agreement with the axis of rotation of the coupling body.

Preferably the shaft coupling according to the invention is designed to be self-centring. This means that by closing the shaft coupling and by clamping the clamping apparatus, the shaft is automatically moved into a central position and is fixed in this position. For example, this is achieved through a diagonal arrangement of a rectangular cross-section or also through a V-shaped arrangement of the coupling opening and a triangular polygonal cross-section of the shaft journal.

A further promotion of self-centring is achieved, for example, by the symmetrical division of the coupling body into the first and the second coupling part. The dividing line in this case runs substantially through the axis of rotation of the shaft journal.

The machine frame and the roller arrangement are suitable and adapted for the industrial production of baked products such as, for example biscuits. In particular, this also relates to the control and/or regulation unit which can be connected to the control unit of a baking machine.

Designated as polygonal according to the invention are shapes which, for example, have a triangular, square, pentagonal, hexagonal, heptagonal or polygonal cross-section. However, also oval shapes, rounded shapes, star shapes correspond to the definition of a polygonal shape according to the invention. In particular the definition covers shapes of cross-sections which differ from a circular cross-section disposed concentrically with the axis of rotation.

The apparatus according to the invention is suitable and/or adapted to be used "in-line" in an industrial production plant for food products.

The invention is described further hereinafter with reference to the figures.

DESCRIPTION OF THE INVENTION

Figure 1:
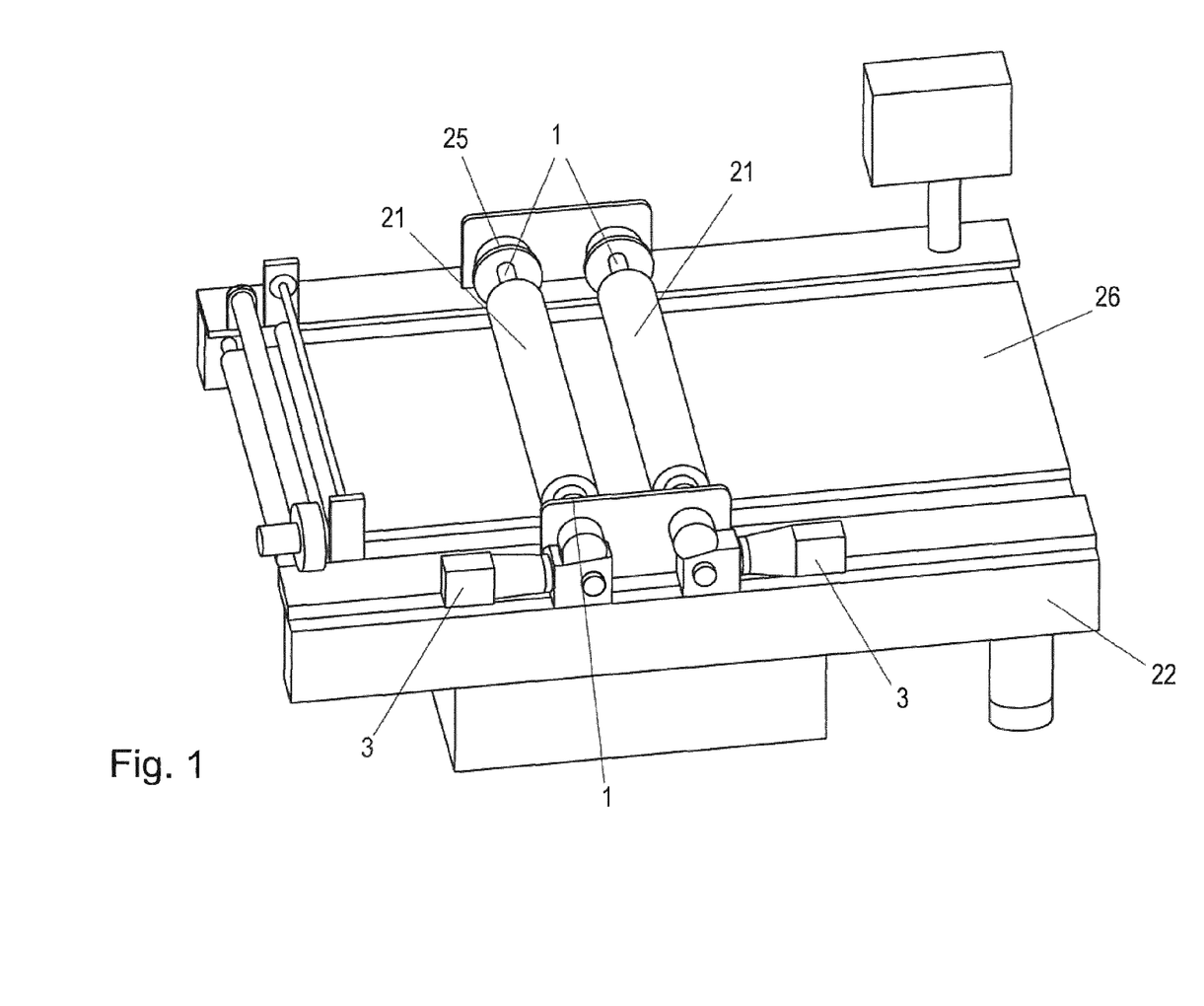
FIG. 1 shows an oblique view of a possible arrangement of the shaft coupling according to the invention and several roller arrangements according to the invention.

FIG. 1 shows a roller arrangement comprising two rollers 21. A conveyor belt 26 is provided in the immediate vicinity of the rollers 21. In this embodiment the rollers are designed as cutting and/or follower rollers. In this case, a dough strip is conveyed on the conveyor belt 26 in the direction of the rollers 21. These have recesses and/or webs for cutting out and shaping biscuit dough shaped bodies.

The rollers 21 and the conveyor belt 26 are connected to a machine frame 22. The rollers 21 are rotationally driven by means of the drive 3. Rollers 21 are provided for cutting out and/or after-shaping the biscuit dough shaped bodies. The rollers can be exchanged to enable the manufacture of various biscuit dough shaped bodies. To this end the shaft coupling according to the invention is provided.

Preferably located underneath the conveyor belt, not visible in the view in FIG. 1, are rubberized counter rollers which act against the pressure of the rollers 21. These are preferably mounted laterally rotatably on the machine frame and roll on the inner side of the conveyor belt.

The shaft coupling is suitable for connecting the roller 21 or its shaft journal 1 to a bearing axle 25 or to a drive shaft of a drive 3.

Figure 2:
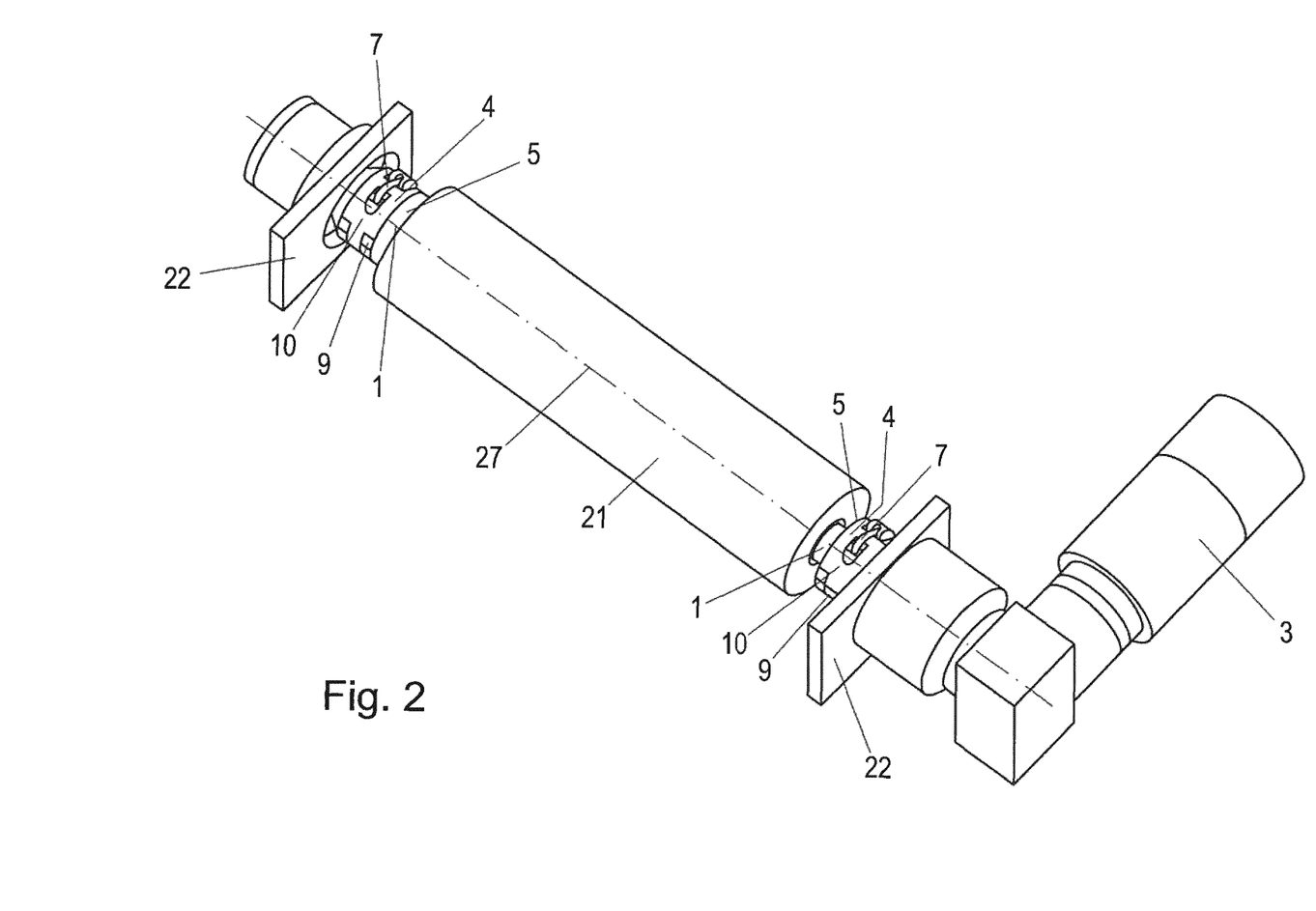
FIG. 2 shows a detail of the roller arrangement according to the invention.

FIG. 2 shows an oblique view of a detail of the roller arrangement according to the invention. A roller 21 has shaft journals 1 protruding on both sides. These shaft journals are adapted to be connected to further components via the shaft coupling according to the invention. In particular, a connection between the machine frame 22 not shown here and the rotatable roller 21 can be made by the shaft coupling according to the invention. The roller 21 can be driven rotatably about an axis of rotation 27 by means of a drive 3. The roller 21 is mounted on both sides on the machine frame 22. The mounting preferably comprises at least one fixed bearing and two floating bearings, wherein one floating bearing is provided on one side and another floating bearing is provided on the other side of the roller 21. The rotational bearings are firmly connected to the machine frame 22. This means that the bearing points are connected substantially rigidly to the machine frame 22. The movable parts of the mountings are rotatable and/or movable. The roller 21 together with the shaft journal 1 can be coupled via the shaft coupling to the bearing points and in particular to the drive 3 or the bearing axle 25. To this end, the shaft coupling comprises a coupling body 4 which comprises a coupling opening 5 for receiving the shaft journal 1. The coupling body further comprises at least one first coupling part 9 and a second coupling part 10. These two coupling parts can be connected to one another by means of a clamping apparatus 7 or can at least be moved and clamped with respect to one another.

Figure 3:
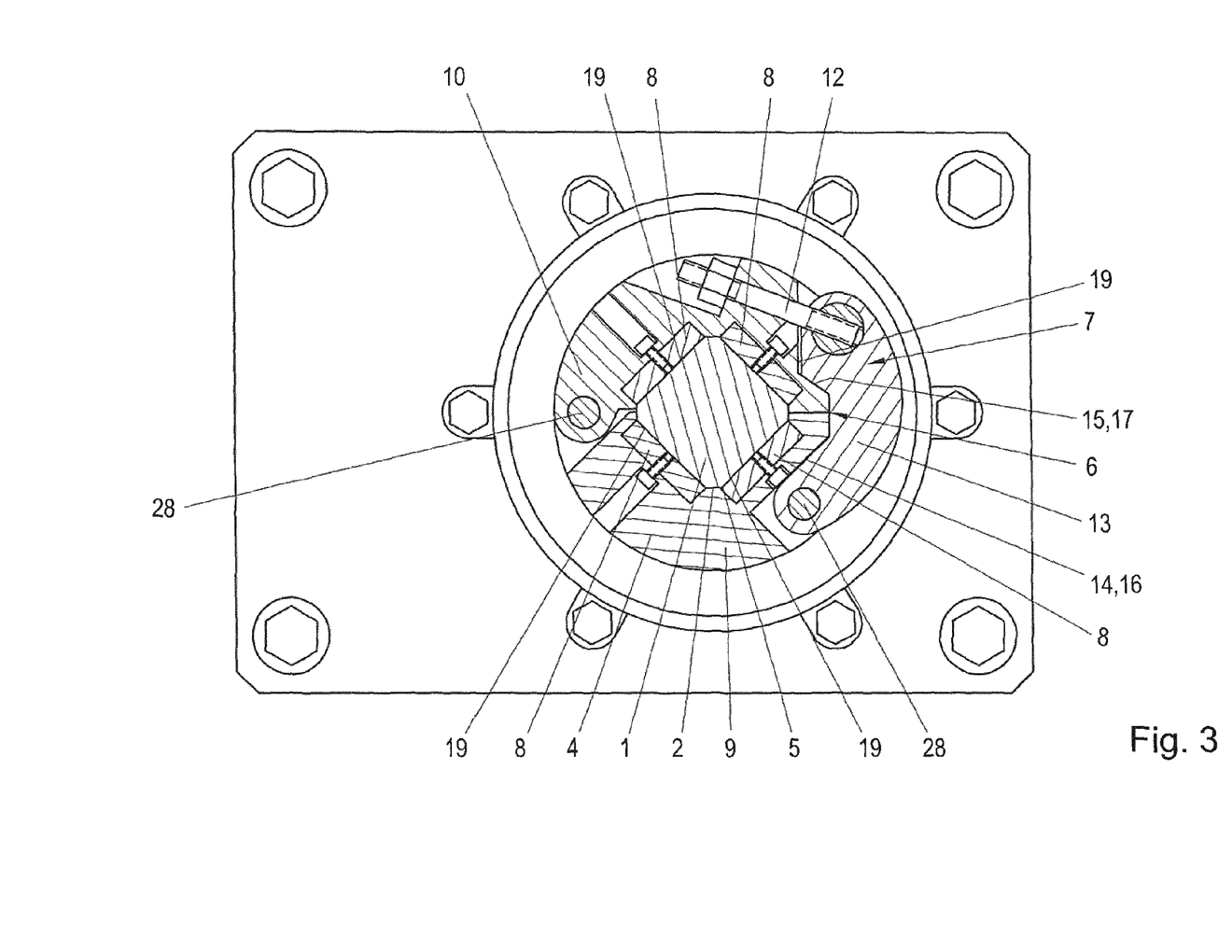
FIG. 3 shows a section through the shaft coupling according to the invention, wherein the plane of intersection substantially runs along a normal plane of the axis of rotation of the roller.

FIG. 3 shows a section through the roller arrangement according to the invention in particular through the shaft coupling according to the invention, where the plane of intersection substantially corresponds to a normal plane of the axis of rotation 27. The plane of intersection runs through the coupling body and the clamping apparatus 7.

The shaft journal 1 having a polygonal cross-section 2 projects into the coupling opening 5 of the coupling body 4. In the present embodiment the cross-section 2 is designed as a substantially rectangular or square cross-section.

The coupling opening 5 substantially corresponds to the cross-section 2 of the shaft journal 1. For the connection the coupling body has clamping jaws 8. These clamping jaws 8 each have a contact surface 19 on their side facing the shaft journal 1. In the closed position the contact surfaces 19 are in direct contact with the shaft journal 1 of the roller 21. The coupling body 4 according to the present embodiment is divided and comprises a first coupling part 9 and a second coupling part 10. These two parts 9, 10 can be moved relative to one another by means of a clamping apparatus 7. In particular, the two coupling parts 9, 10 can be firmly connected to one another by means of the clamping apparatus 7. In the present embodiment the two coupling parts 9, 10 are connected to one another in a hinge-like manner on one side by means of a rotary joint 28. The clamping apparatus 7 is provided on the other side of the coupling body 4. The coupling body 4 is divided along a dividing line 6 into the first coupling part 9 and the second coupling part 10. The first coupling part 9 can be connected to the second coupling part 10 by means of the clamping apparatus 7. To this end, the clamping apparatus comprises a screw connection 12 by which means a connection of the first coupling part to the second coupling part can be made directly or indirectly. In the present embodiment of FIG. 3, this connection is made indirectly. This means that the clamping apparatus 7 comprises a screw connection 12 and a clamping clip 13. The clamping clip 13 is connected in a hinge-like manner via a rotary joint 28 to the first coupling part 9. To this end the screw connection 12 is adapted to connect the clamping clip 13 to the second coupling part 10. By tightening the screw connection, the two coupling parts 9, 10 are firmly connected to one another by means of the clamping clip 13.

In the present embodiment, centring flanks are provided for fastening the two coupling parts. Thus, the clamping clip comprises a first centring flank 14 and a second centring flank 15. Furthermore, the first coupling part 9 is provided with a centring flank 16 and the second coupling part is provided with a centring flank 17. By tightening the clamping clip 13, the first centring flank 14 comes into contact with the centring flank 16 of the first coupling part 9.

Furthermore, by tightening the clamping clip 13, the second centring flank 15 comes into contact with the centring flank 17 of the second coupling part. The flanks preferably run obliquely to the direction of movement of the clamping clip 13 so that a centring by means of the centring flanks is made possible by tightening the screw connection 12 and/or the clamping clip 13. Furthermore, the centring flanks are adapted in such a manner that upon tightening the clamping clip 13 and the screw connection 12, the two coupling parts 9, 10 are moved towards one another. Preferably this arrangement of the centring flanks is designed as a wedge-shaped arrangement. Thus, the first and the second centring flank 14, 15 form a wedge-shaped section. In the same way, the centring flanks 16, 17 of the coupling parts 9, 10 together form a wedge-shaped section. According to the present embodiment, one of the wedge-shaped sections is implemented in the form of an extension and the other wedge-shaped section is designed to be groove-shaped. By pressing together the two wedge-shaped sections, the coupling body is centred, closed and/or clamped. Clamping jaws 8 are provided along the coupling opening 5. These clamping jaws are preferably movable by means of adjusting thread 18. As a result, the position of the clamping jaws 8 can be varied to a small extent relative to the coupling body 4. For example, a centring of the shaft journal 1 with respect to the axis of rotation 20 of the roller can be achieved thereby.

For changing the roller 21, in the present embodiment the screw connection can be released or loosened so that the clamping clip 13 of the clamping apparatus 7 can be pivoted away around the rotary joint 28. As a result, the first and the second centring flank become separated from the separating flanks of the coupling parts 16, 17. Subsequently the locking and connection of the first coupling part 9 to the second coupling part 10 is released. This can then be opened around the rotary joint 28. The dividing line 6 is disposed in such a manner that the shaft journal 1 can be removed by dividing the coupling body 4. In the present embodiment the dividing line 6 runs substantially through the axis of rotation 20 and through the axis of symmetry of the cross-section 2 of the shaft journal 1.

When the coupling body 4 is closed, a positive polygonal connection is produced via the clamping apparatus 7 and the clamping jaws 8. Furthermore, a clamping connection is achieved by means of the special configuration and in particular the size of the cross-section 2 of the shaft journal 1 and the coupling opening 5. Thus, the coupling opening 5 or the contact surfaces 19 of the clamping jaws 8 are configured in such a manner that when the shaft coupling is closed, the shaft journal 1 is clamped in. Optionally a gap 11 is provided along the dividing line 6 even when the shaft coupling is closed. This enables the shaft journal 1 to be clamped in without the clamping force being reduced by the coupling parts 9, 10 contacting one another.

Also the pressure exerted by the shaft coupling on the shaft journal 1 or the applied contact pressure can be adjusted by means of the geometry of the centring flanks or via the clamping apparatus 7.

Figure 4:
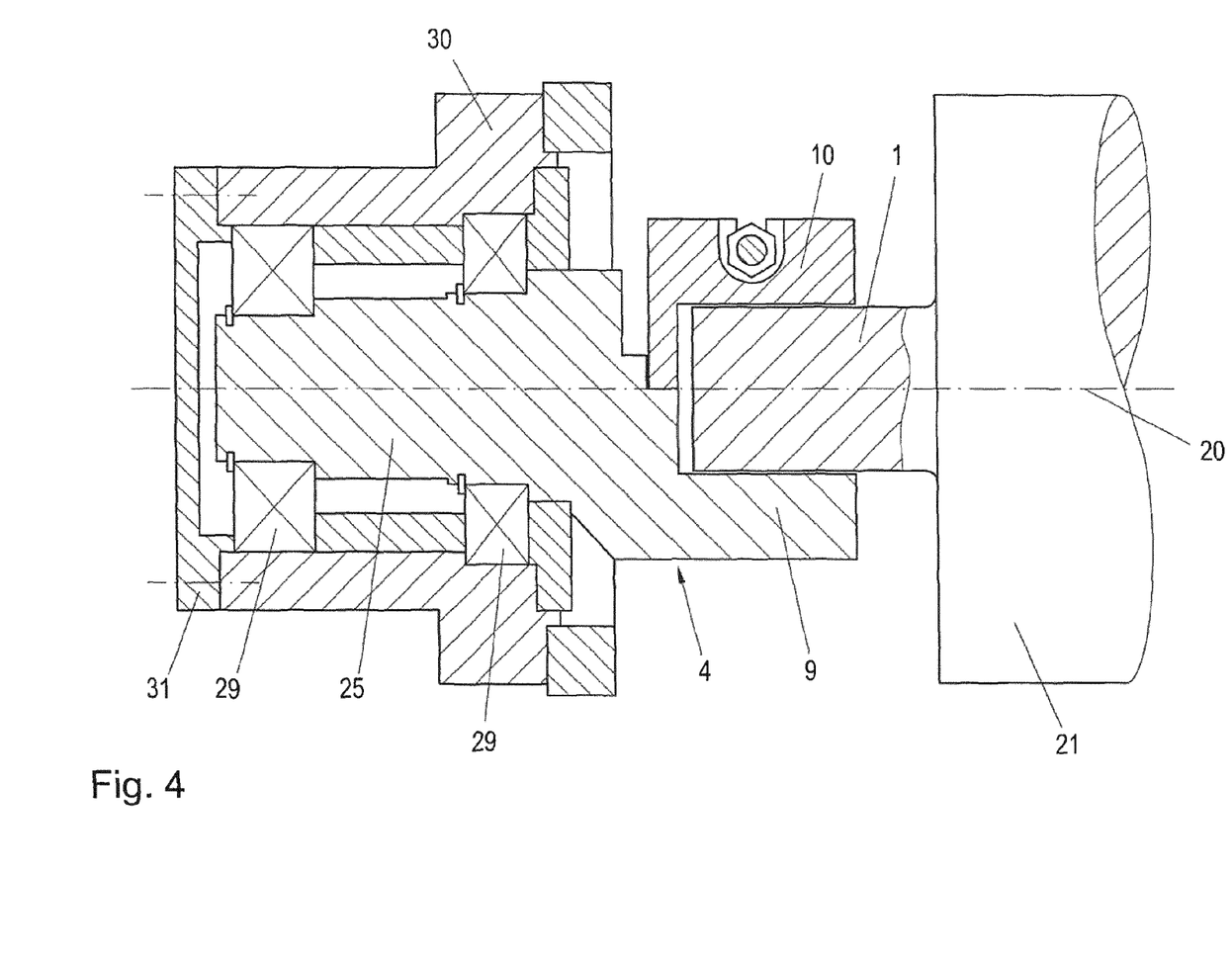
FIG. 4 shows a shaft coupling according to the invention in a sectional view.

FIG. 4 shows another section of a roller arrangement according to the invention and/or a shaft coupling according to the invention. The roller 21 has a shaft journal 1 which protrudes laterally from the roller 21. According to the present invention, this shaft journal is designed to be polygonal or the shaft journal has a polygonal cross-section 2. This shaft journal is adapted to be connected positively and non-positively to the coupling body 4. The coupling body 4 is designed to be multipart and comprises a first coupling part 9 and a second coupling part 10. These parts can be connected to one another and clamped with respect to one another by means of a clamping apparatus 7 so that the shaft journal 1 is clamped in the coupling body 4. In the diagram of FIG. 4, the shaft journal 1 is connected to a bearing axle 25. This arrangement is preferably provided on that side of the roller 21 on which no drive acts. At this point the roller is merely mounted. To this end, two radial bearings 29 are provided in the present embodiment. These radial bearings are held in one bearing block 30 where the bearing block 30 can be designed to be sleeve-shaped or multipart. Furthermore, the bearing block 30 is closed with a bearing cover 31. The bearing block 30 is preferably rigidly connected to the machine frame 22. The roller 21 is mounted rotationally with respect to the machine frame 22 by means of the radial bearing 29 and the bearing block 30. According to one embodiment, one of the two radial bearings 29 can be designed as a fixed bearing.

If the shaft coupling is now opened to remove the roller 21, the bearing axle 25 and the radial bearings 29 remain firmly arranged on the machine frame. This has the advantage according to the invention that the bearing block 30 need not be opened and the bearings need not be pulled away from the shaft journal. On the contrary, the shaft coupling can be opened and the roller removed by means of a simple actuating element.

Figure 5:
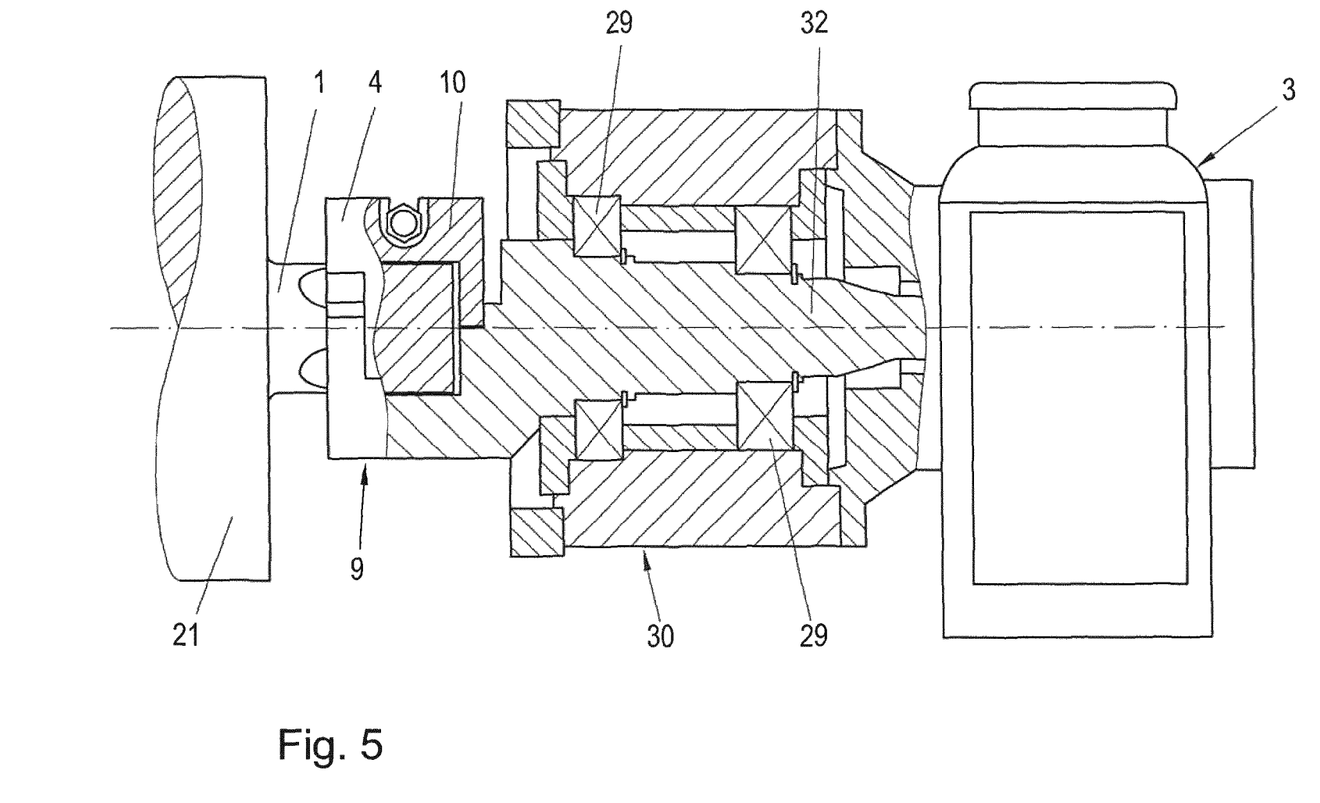
FIG. 5 shows another sectional view of the shaft coupling according to the invention, wherein the sectional planes of FIGS. 4 and 5 substantially follow the axis of rotation of the roller.

FIG. 5 shows a section through the drive-side shaft coupling and its mounting, where the sectional plane substantially corresponds to the sectional plane from FIG. 4. Again a shaft 21 is clamped positively and non-positively in a coupling body 4 by means of a shaft journal 1 having a polygonal cross-section. The coupling body substantially corresponds to the embodiment of the afore-mentioned coupling body comprises a multipart coupling body 4 which is designed to be closed and locked by means of a clamping apparatus 7, wherein a first coupling part 9 and a second coupling part 10 are pulled towards one another in such a manner that the shaft journal 1 of the roller 21 is clamped in the coupling opening 5 of the coupling body 4. The coupling body 4 is further connected to the drive shaft 32 of the drive 3. The drive shaft 32 is mounted rotationally in a bearing block 30 by means of two radial bearings 29. Preferably one of the two radial bearings 29 is designed as a fixed bearing. In particular, that bearing located closest to the drive 3 is designed as a fixed bearing. The bearing block 30 is adapted to receive the radial bearings 29. As noted in the descriptions of the previous embodiments, the bearing block 30 is designed, for example, as a sleeve, closable bearing block or similar body which is adapted and suitable to hold the radial bearings in such a manner that a rotational mounting of the drive shaft or the bearing axis is made possible.

The drive 3 is connected to the machine frame 22 or the bearing block 30 in a torsionally rigid manner. The bearing block 30 is preferably connected to the machine frame 22 in a torsionally rigid manner. As a result, on the one hand a supporting of the drive 3 with respect to the machine frame 22 is made possible. On the other hand, the roller 21 or the shaft journal thereof 1 is thereby rotationally mounted in the region of the drive 3.

In order to now be able to remove the roller 21 in the region of the drive, merely the clamping apparatus 7 and the coupling body 4 need be opened in order to be able to remove the shaft journal 1. The drive shaft, the radial bearings 29 of the drive shaft and the drive remain connected to the machine frame 22.

This ease of mounting and dismounting also prevents contamination, for example, by oil.

REFERENCE SIGNS

1 Shaft journal
2 Cross-section
3 Drive
4 Coupling body
5 Coupling opening
6 Dividing line
7 Clamping apparatus
8 Clamping jaw
9 First coupling part
10 Second coupling part
11 Gap
12 Screw connection
13 Clamping clip
14 First centring flank
15 Second centring flank
16 Centring flank of first coupling part
17 Centring flank of second coupling part
18 Adjusting thread
19 Contact surface
20 Axis of rotation
21 Roller
22 Machine frame
23 Conveying direction
24 Roller gap
25 Bearing axle
26 Conveyor belt
27 Axis of rotation
28 Rotary joint
29 Radial bearing
30 Bearing block
31 Bearing cover
32 Drive shaft

The invention claimed is:

1. A shaft coupling for coupling of a shaft journal with a polygonal cross-section to a drive or a bearing axle, the shaft coupling comprising:
   a rotatably drivable coupling body formed with a coupling opening for receiving the polygonal shaft journal,
      said coupling body including a first coupling part, a second coupling part, and being openable along a dividing line; and
      said dividing line intersecting said the coupling opening;
   a clamping apparatus configured for force-locking holding the shaft journal in said coupling opening, said clamping apparatus including a clamping clip formed with a first centering flank and a second centering flank;
   said coupling opening being formed, at least in part, by clamping jaws configured to assume a closed position wherein said clamping jaws are pressed onto said shaft journal via said clamping apparatus;
   wherein, in the closed position, said first centering flank of said clamping clip is in operative contact with a centering flank of said first coupling part and said second centering flank of said clamping clip is in operative contact with a centering flank of said second coupling part.

2. The shaft coupling according to claim 1, wherein said first coupling part is movable with respect to said second coupling part for force-locking connection of said shaft journal to said coupling body and for release of the connection via said clamping apparatus.

3. The shaft coupling according to claim 1, wherein, in the closed position and with the shaft journal clamped, a gap remains free between said first coupling part and said second coupling part.

4. The shaft coupling according to claim 1, wherein a connection between said first coupling part and said second coupling part is a hinge connection on one side and wherein said clamping apparatus is disposed on the opposite side.

5. The shaft coupling according to claim 1, wherein said clamping apparatus comprises a screw connection for connecting said first coupling part to said second coupling part.

6. The shaft coupling according to claim 1, wherein said clamping clip is connected, or connectible, to one coupling part on one side in a hinge connection and to the other coupling part on the other side.

7. The shaft coupling according to claim 1, wherein said clamping jaws are movably disposed with respect to said coupling body, and movable by way of an adjusting thread, for centering the shaft journal.

8. The shaft coupling according to claim 1, wherein said clamping jaws are formed with contact surfaces for contact against said shaft journal and said contact surfaces, in the closed position, are distributed substantially radially symmetrically or rotationally symmetrically about an axis of rotation of the coupling body.

9. The shaft coupling according to claim 1, wherein the shaft journal is clamped between said clamping jaws by clamping said clamping apparatus.

10. The shaft coupling according to claim 1, wherein said clamping jaws (8) are pressed onto said shaft journal in an areal surface contact.

11. A roller arrangement for processing shaped bodies or dough strips to produce baked products, the roller arrangement comprising:
 a roller;
 a machine frame; and
 a shaft coupling according to claim 1 disposed to couple said roller to said machine frame.

12. The roller arrangement according to claim 11, configured in a machine for producing biscuits.

13. The roller arrangement according to claim 11, which comprises a driven conveyor belt for conveying a dough strip, wherein a speed of said conveyor belt in a conveying direction is substantially equal to a circumferential speed of said roller, and wherein a roller gap is formed between said conveyor belt and said roller for passage of the dough strip through said roller gap.

14. The roller arrangement according to claim 11, wherein said roller is removably disposed by opening said coupling body and wherein the drive, the radial bearing for mounting the drive shaft, and the drive shaft are connected to said machine frame.

15. The roller arrangement according to claim 11, wherein said roller is removably disposed by opening said coupling body and wherein the drive, the radial bearing for mounting the bearing axle, and the bearing axle are connected to said machine frame.

16. The roller arrangement according to claim 15, wherein the first coupling part and the bearing axle are integrally connected in one piece to one another and/or the first coupling part and the drive shaft are integrally connected in one piece to one another.

* * * * *